US012407135B2

(12) United States Patent
Luo et al.

(10) Patent No.: US 12,407,135 B2
(45) Date of Patent: Sep. 2, 2025

(54) ANTI-MISPLUG SOCKET

(71) Applicant: Shenzhen Xinli Intelligent Technology Co., Ltd., Shenzhen (CN)

(72) Inventors: Huangxin Luo, Shenzhen (CN); Haifeng Zheng, Shenzhen (CN)

( * ) Notice: Subject to any disclaimer, the term of this patent is extended or adjusted under 35 U.S.C. 154(b) by 0 days.

(21) Appl. No.: 19/095,300

(22) Filed: Mar. 31, 2025

(65) Prior Publication Data

US 2025/0226616 A1 Jul. 10, 2025

(30) Foreign Application Priority Data

Mar. 20, 2025 (CN) ......................... 202510331250.1

(51) Int. Cl.
*H01R 13/64* (2006.01)

(52) U.S. Cl.
CPC .................................... *H01R 13/64* (2013.01)

(58) Field of Classification Search
CPC ......... H01R 24/78; H01R 13/64; H01H 17/00
See application file for complete search history.

(56) References Cited

U.S. PATENT DOCUMENTS 5,652,419 A * 7/1997 Amonett .............. H01H 43/026 200/37 A
6,116,931 A * 9/2000 McCleerey .............. H01R 4/06 439/651
6,840,824 B2 * 1/2005 Harada ................ H01R 13/114 439/857
7,537,471 B2 * 5/2009 Teicher .................. H01R 13/64 439/172
7,833,032 B1 * 11/2010 Yu ........................ H01R 13/703 439/668
7,857,639 B1 * 12/2010 Chang .................... H01R 27/00 439/131
7,985,101 B2 * 7/2011 Fitzpatrick ............. H01R 27/00 439/676
8,216,000 B2 * 7/2012 Su ...................... H01R 13/7033 439/668
8,333,609 B2 * 12/2012 Sato ....................... H01R 13/64 381/80
8,610,016 B2 * 12/2013 Yang .................... H01R 4/4821 200/543

(Continued)

*Primary Examiner* — Thanh Tam T Le
(74) *Attorney, Agent, or Firm* — Daniel M. Cohn; Howard M. Cohn

(57) ABSTRACT

The invention relates to an anti-misplug socket, an electrical contact component of the anti-misplug socket comprises two first conducting strips, two second conducting strips and two third conducting strips, the two first conducting strips are arranged crosswise, a first movable contact and a second movable contact are arranged at one end of each first conducting strip, each second conducting strip is provided with a first fixed contact, each third conducting strip is provided with a second fixed contact and a plug-in part, the first movable contact and the second movable contact near one plug-in part are in respective contact with the corresponding first fixed contact and second fixed contact when only one plug pin is plugged into the plug-in part, and the first movable contact and the second movable contact near the other plug-in part respectively are spaced apart from the corresponding first fixed contact and second fixed contact.

10 Claims, 4 Drawing Sheets

(56) References Cited

U.S. PATENT DOCUMENTS 8,864,505 B2 * 10/2014 Chuang .............. H01R 13/7033
439/652
8,968,013 B2 * 3/2015 Tochi ................... H01R 13/501
439/131

* cited by examiner

ANTI-MISPLUG SOCKET

TECHNICAL FIELD

The invention relates to the technical field of electrical appliances, in particular to an anti-misplug socket.

BACKGROUND ART

A socket is a receptacle for one or more circuit connections to be plugged, widely used in daily life and production. The socket allows various wirings to be plugged, and facilitates connection with other circuits. By connecting or disconnecting the circuit with the copper part, the socket ultimately achieves the connection or disconnection of that part of the circuit.

The traditional socket has a simple structure, primarily consisting of fixed conducting strips connected to both sides of the jacks on the positive and negative electrodes to form a complete circuit for power supply. When the positive and negative conducting strips are connected to the power supply, all the jacks on the socket become live. However, the structure has low safety performance. In daily use, if a conductive object is inserted into any jack, electric shock injuries, electrocution hazards or short circuits to electrical appliances may be easily caused, posing significant potential safety hazards.

Therefore, a product is urgently needed to solve the above problems.

SUMMARY OF THE INVENTION

The invention aims to solve the technical problem that the existing socket easily causes mis-contact.

To solve the above technical problem, the invention provides an anti-misplug socket, which adopts the following technical proposal:

- the anti-misplug socket comprises a mounting seat and an electrical contact component arranged in the mounting seat, the electrical contact component comprises two first conducting strips, two second conducting strips and two third conducting strips, the two first conducting strips are arranged crosswise, a first movable contact is arranged at one end of each first conducting strip, and a second movable contact is arranged at the other end thereof;
- each second conducting strip is provided with a first fixed contact, and the two first fixed contacts correspond to the two first movable contacts one to one at intervals;
- a second fixed contact is arranged at one end of each third conducting strip, the two second fixed contacts correspond to the two second movable contacts one to one at intervals, a plug-in part is arranged at the other end of each third conducting strip, and the two plug-in parts are arranged between the first movable contact of one first conducting strip and the second movable contact of the other first conducting strip, so that the first movable contact and the second movable contact near one of the plug-in parts are in contact with the corresponding first fixed contact and second fixed contact when the plug pin is plugged into the plug-in part.

Optionally, each of the first conducting strips comprises a connecting segment, a first elastic segment bent from one end of the connecting segment and a second elastic segment bent from the other end of the connecting segment, the two connecting segments are arranged crosswise, the first movable contact is arranged at the end of the first elastic segment and deviated from one side of the plug-in part, and the second movable contact is arranged at the end of the second elastic segment and deviated from side of the plug-in part.

Optionally, a clearance slot is arranged at the crossing point of the two connecting segments.

Optionally, each of the plug-in parts is provided with a jacking structure, and each of the jacking structures comprises two top jacking parts respectively arranged on both sides of the plug-in part, and the two jacking parts are respectively arranged on the first elastic segment and the second elastic segment near the plug-in part and face towards one side of the plug-in part.

Optionally, the jacking pieces are made of plastic materials.

Optionally, the two first elastic segments are arranged horizontally, and the two second elastic segments are arranged horizontally.

Optionally, the two first elastic segments form an included angle, the two second elastic segments form an included angle, and the included angle of the two first elastic segments is the same as that of the two second elastic segments.

Optionally, an anti-creeping structure also comprises a ground conducting strip.

Optionally, the mounting seat comprises a base and a panel covered on the base, the base is provided with a mounting groove, the mounting groove comprises two mounting cavities symmetrically arranged and interconnected, one second conducting strip, one third conducting strip as well as the first movable contact of one first conducting strip and the second movable contact of the other first conducting strip are arranged in each mounting cavity.

Optionally, the two second conducting strips are arranged on the same side in the mounting groove.

Compared with the prior art, the anti-misplug socket provided by the invention mainly has the following beneficial effects:

- the anti-misplug socket comprises a mounting seat and an electrical contact component arranged in the mounting seat, the electrical contact component comprises two first conducting strips, two second conducting strips and two third conducting strips, the two first conducting strips are arranged crosswise, a first movable contact and a second movable contact are arranged at one end of each first conducting strip, each second conducting strip is provided with a first fixed contact, each third conducting strip is provided with a second fixed contact and a plug-in part, the two plug-in parts are arranged between the first movable contact of one first conducting strip and the second movable contact of the other first conducting strip, the first movable contact and the second movable contact near one plug-in part are in respective contact with the corresponding first fixed contact and second fixed contact when only one plug pin is plugged into the plug-in part, and the first movable contact and the second movable contact near the other plug-in part respectively are spaced apart from the corresponding first fixed contact and second fixed contact; at this time, the movable contact at one end of the first conducting strip is not in contact with the corresponding fixed contact, and the socket is still in off position, thus effectively avoiding potential safety hazards such as electric shock injury, electric shock hazard or short-circuit failures of electrical appliances caused by misplug of a conductive object into any jack and significantly improving the use safety of the socket.

BRIEF DESCRIPTION OF THE DRAWINGS

To better describe the proposals of the invention, the following provides a brief introduction to the drawings required for describing the embodiments. Obviously, the drawings in the following description depict some embodiments of the invention. For those skilled in the art, other drawings can be obtained based on these drawings without creative effort.

REFERENCES SIGNS IN THE DRAWINGS

Figure 1:
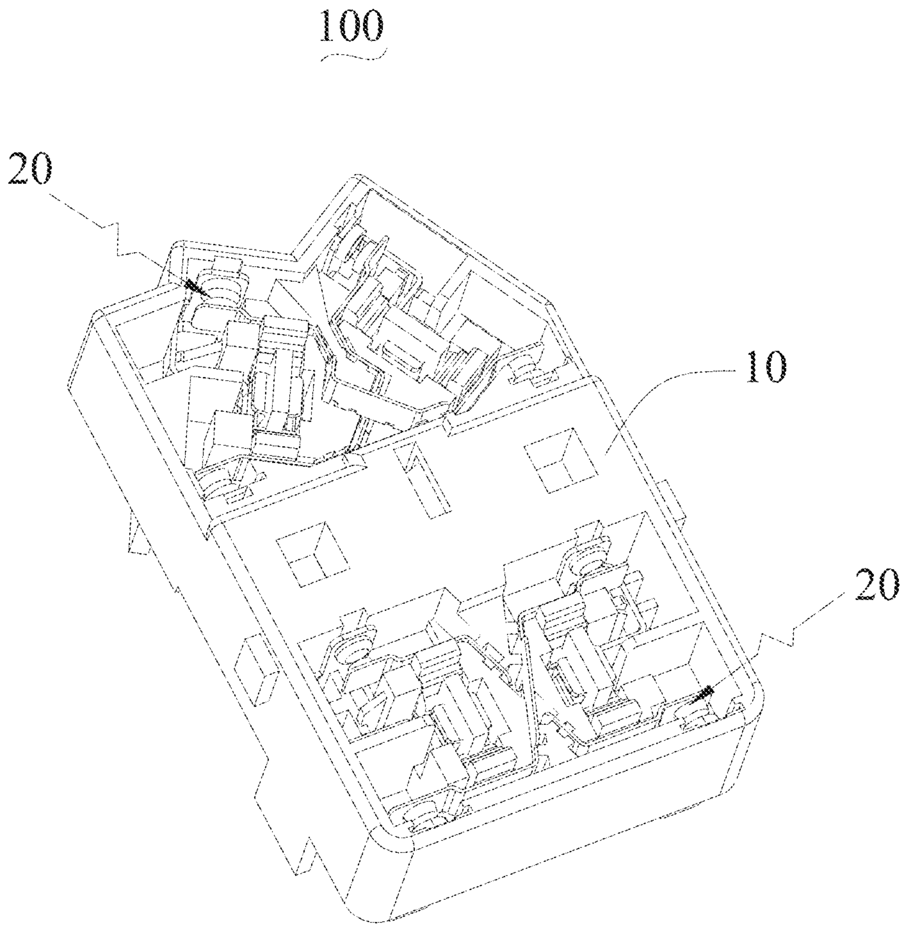
FIG. 1 is the three-dimensional structure diagram of an anti-misplug socket in an embodiment of the invention.

100. Anti-misplug socket; 10. Base; 11. Mounting groove; 111. Mounting cavity; 20. Electrical contact component; 21. First conducting strip; 211. First movable contact; 212. Second movable contact; 213. Connecting segment; 214. First elastic segment; 215. Second elastic segment; 216. Clearance slot; 22. Second conducting strip; 221. First fixed contact; 23. Third conducting strip; 231. Second fixed contact; 232. Plug-in part; 24. Jacking structure; 241. Jacking part; 25. Ground conducting strip; 30. Plug pin.

DETAILED DESCRIPTION OF THE INVENTION

Unless otherwise defined, all technical and scientific terms used herein have the same meanings as commonly understood by those skilled in the technical field of the invention. The terms used in the specification are only for the purpose of describing embodiments, but not intended to limit the invention. For example, terms such as "length", "width", "upper", "lower", "left", "right", "front", "rear", "vertical", "horizontal", "top", "bottom", "inside" and "outside" indicate orientations or locations based on those shown in the drawings. These terms are used merely for ease of description and should not be construed as limiting the technical proposals.

In the specification and claims of the invention, as well as in the above description of the drawings, the terms "comprise" and "have", along with any variations thereof, are intended to cover non-exclusive inclusion. Terms such as "first" and "second" used in the specification, claims, or drawings of the invention are intended to distinguish between different objects, but not intended to describe a specific order. The term "a plurality of" means two or more, unless explicitly and specifically defined otherwise.

In the specification and claims of the invention, as well as in the foregoing description of the drawings, when an element is referred to as being "fixed to", "installed on", "arranged on" or "connected to" another element, it may be directly or indirectly positioned on or connected to another element. For example, when an element is described as being "connected to" another element, it may be directly or indirectly connected to another element.

Furthermore, reference to "embodiments" herein indicates that specific features, structures or characteristics described in connection with the embodiments may be included in at least one embodiment of the invention. The appearance of this word in various places in the specification does not necessarily refer to the same embodiment, nor is it an independent or alternative embodiment mutually exclusive to other embodiments. Those skilled in the art explicitly and implicitly understand that the embodiments described herein may be combined with other embodiments.

Figure 2:
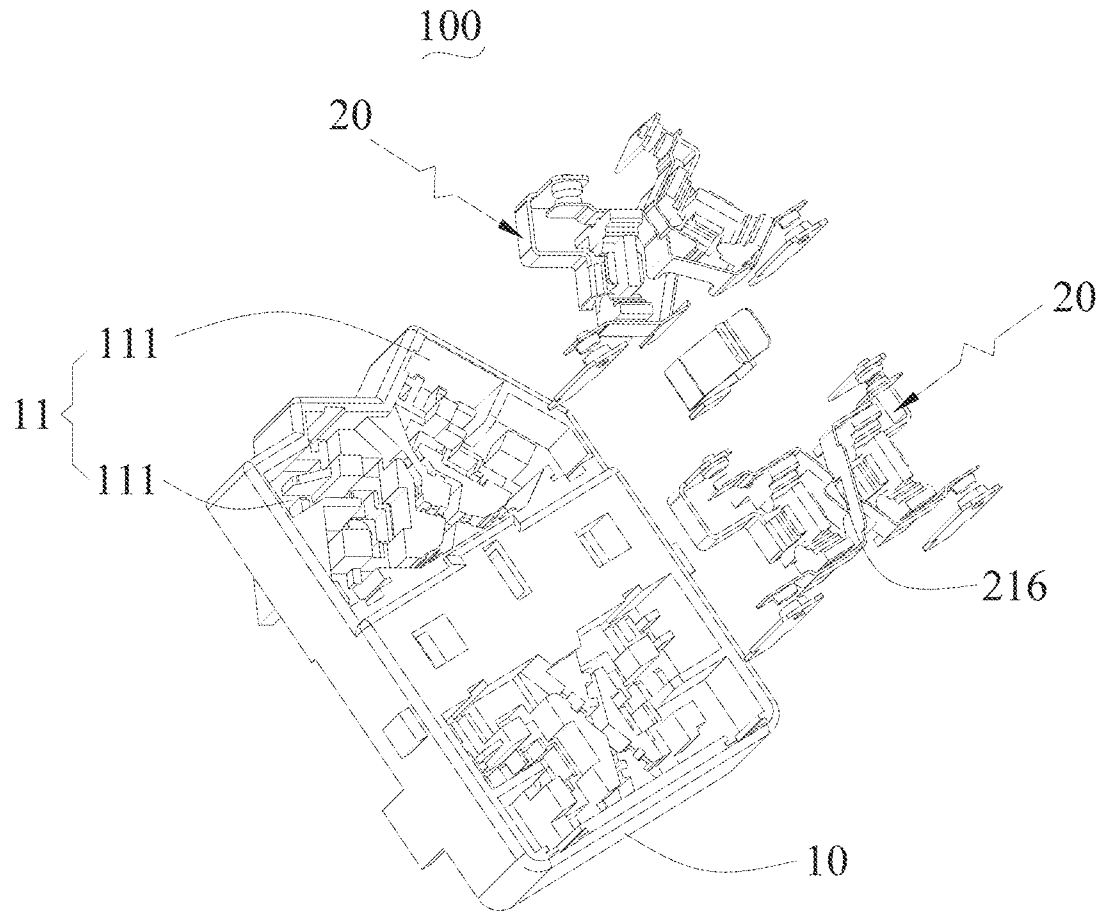
FIG. 2 is the exploded three-dimensional view of an anti-misplug socket in FIG. 1.
Figure 3:
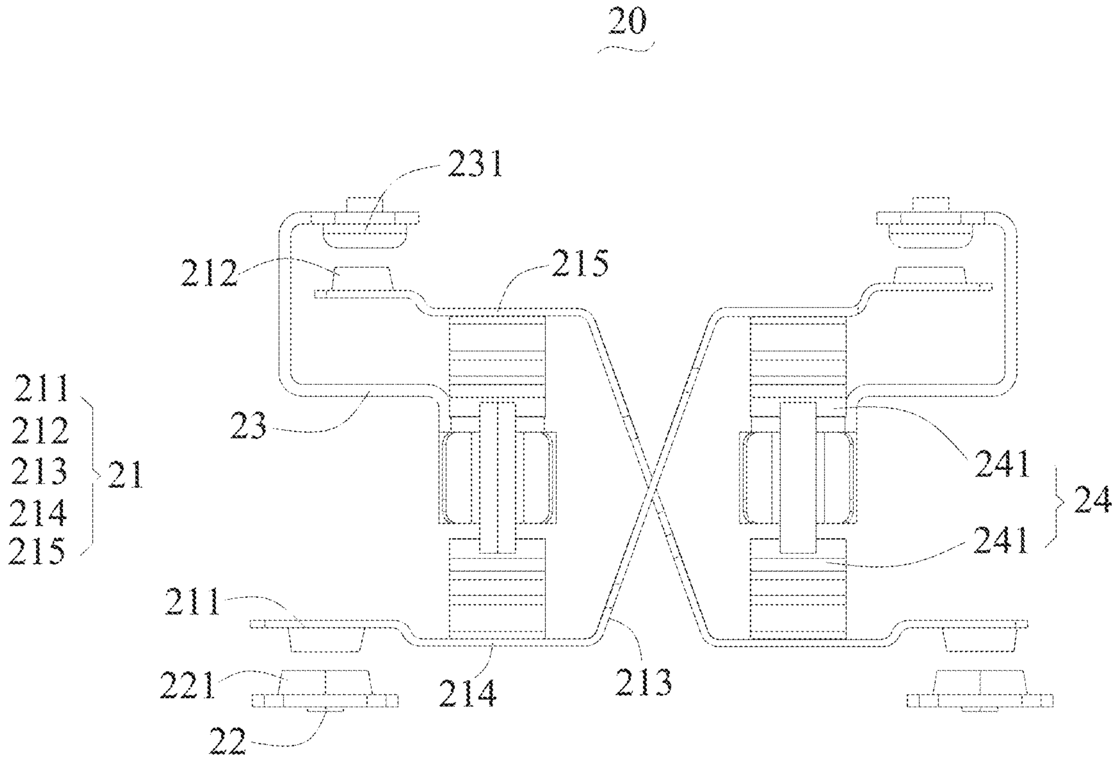
FIG. 3 is the front view of Embodiment 1 for an electrical contact component in FIG. 2.

The embodiment of the invention provides an anti-misplug socket 100. As shown in FIG. 1 to FIG. 3, the anti-misplug socket 100 comprises a mounting seat and an electrical contact component 20 arranged in the mounting seat. The electrical contact component 20 comprises two first conducting strips 21, two second conducting strips 22 and two third conducting strips 23, the two first conducting strips 21 can be arranged crosswise, a first movable contact 211 can be arranged at one end of each first conducting strip 21, and a second movable contact 212 can be arranged at the other end thereof. Understandably, the two first conducting strips 21 are arranged crosswise, the first movable contacts 211 of both first conducting strips 21 are located on the lower side of the first conducting strips 21, and the second movable contacts 212 of both first conducting strips 21 are located on the upper side of the first conducting strips 21, so that the first movable contacts 211 may also be located on the upper side of the first conducting strips 21, and the second movable contacts 212 may also be located on the lower side of the first conducting strips 21. In other words, the first movable contact 211 of one first conducting strip 21 and the second movable contact 212 of the other first conducting strip 21 are located on the right side, while the second movable contact 212 of one first conducting strip 21 and the first movable contact 211 of the other first conducting strip 21 are located on the left side.

Each second conducting strip 22 is provided with a first fixed contact 221, and the two first fixed contacts 221 correspond to the two first movable contacts 211 one to one at intervals, i.e., the first fixed contact 221 and the first movable contact 211 are in a normally open state. Understandably, the two second conducting strips 22 are respectively arranged on the left and right sides, one first fixed contact 221 is spaced apart from and corresponds to the first movable contact 211 of one first conducting strip 21, while the other first fixed contact 221 is spaced apart from and corresponds to the first movable contact 211 of the other first conducting strip 21.

the second fixed contact 231 can be arranged at one end of each third conducting strip 23, and the two second fixed contacts 231 may be spaced apart from and correspond to the two second movable contacts 212, i.e., the second fixed contacts 231 and the second movable contacts 212 are in a normally open state. Understandably, the two third conducting strips 23 are respectively arranged on the left and right sides, one second fixed contact 231 is spaced apart from and corresponds to the second movable contact 212 of one first conducting strip 21, while the other second fixed contact 231 is spaced apart from and corresponds to the second movable contact 212 of the other first conducting strip 21. The plug-in part 232 can be arranged at the other end of each third conducting strip 23, and the two plug-in parts 232 can be arranged between the first movable contact 211 of one first conducting strip 21 and the second movable contact 212 of the other first conducting strip 21, so that the first movable contact 211 and the second movable contact 212 near one plug-in part 232 are in respective contact with the corresponding first fixed contact 221 and second fixed contact 231 when the plug pin 30 is plugged into the plug-in part 232. Understandably, the two third conducting strips 23 are arranged on the left and right sides, and the plug pin 30 simultaneously presses against the first movable contact 211

(on one first conducting strip 21) and the second movable contact 212 (on the other second conducting strip 22) on the left side when the plug pin 30 is plugged into the left plug-in part 232, so that the two movable contacts are in respective contact with the first fixed contact 221 and the second fixed contact 231 on the left side. The same principle applies to the right side, which will not be repeated here.

Understandably, the anti-misplug socket 100 is based on the following operating principle:

When the plug pin 30 is plugged into only one plug-in part 232 on one side, only the first movable contact 211 and the second movable contact 212 on that side come into contact with the corresponding first fixed contact 221 and second fixed contact 231 respectively, while the first movable contact 211 and the second movable contact 212 on the other side are spaced apart from the corresponding first fixed contact 221 and second fixed contact 231, i.e., one movable contact at one end of each first conducting strip 21 still comes into contact with the corresponding fixed contact, and the socket is still in an off state.

When the plug pins 30 are simultaneously plugged into the plug-in parts 232 on both sides, the first movable contacts 211 and the second movable contacts 212 on both sides respectively come into contact with the corresponding first fixed contacts 221 and second fixed contacts 231, i.e., both the first movable contacts 211 and the second movable contacts 212 of the two first conducting strips 21 are connected to the corresponding first fixed contacts 221 and second fixed contacts 231, and the socket is in an on state.

To sum up, compared with the prior art, the anti-misplug socket 100 has at least the following beneficial effects:

The anti-misplug socket 100 operates as follows: when only one plug pin 30 is plugged into one plug-in part 232, the adjacent first movable contact 211 and second movable contact 212 respectively come in contact with the corresponding first fixed contact 221 and second fixed contact 231, while the first movable contact 211 and the second movable contact 212 near the other plug-in part 232 are spaced apart from the corresponding first fixed contact 221 and second fixed contact 231. In this state, at least one movable contact at one end of each first conducting strip 21 fails to come in contact with the corresponding fixed contact, and the socket is still in an off state, thus effectively avoiding potential safety hazards such as electric shock injury, electric shock hazard or short-circuit failures of electrical appliances caused by misplug of a conductive object into any jack and significantly improving the use safety of the socket.

To enable those skilled in the art to better understand the proposals of the invention, the technical proposals in the embodiments of the invention are described clearly and completely below with reference to FIG. 1 to FIG. 4.

Figure 4:
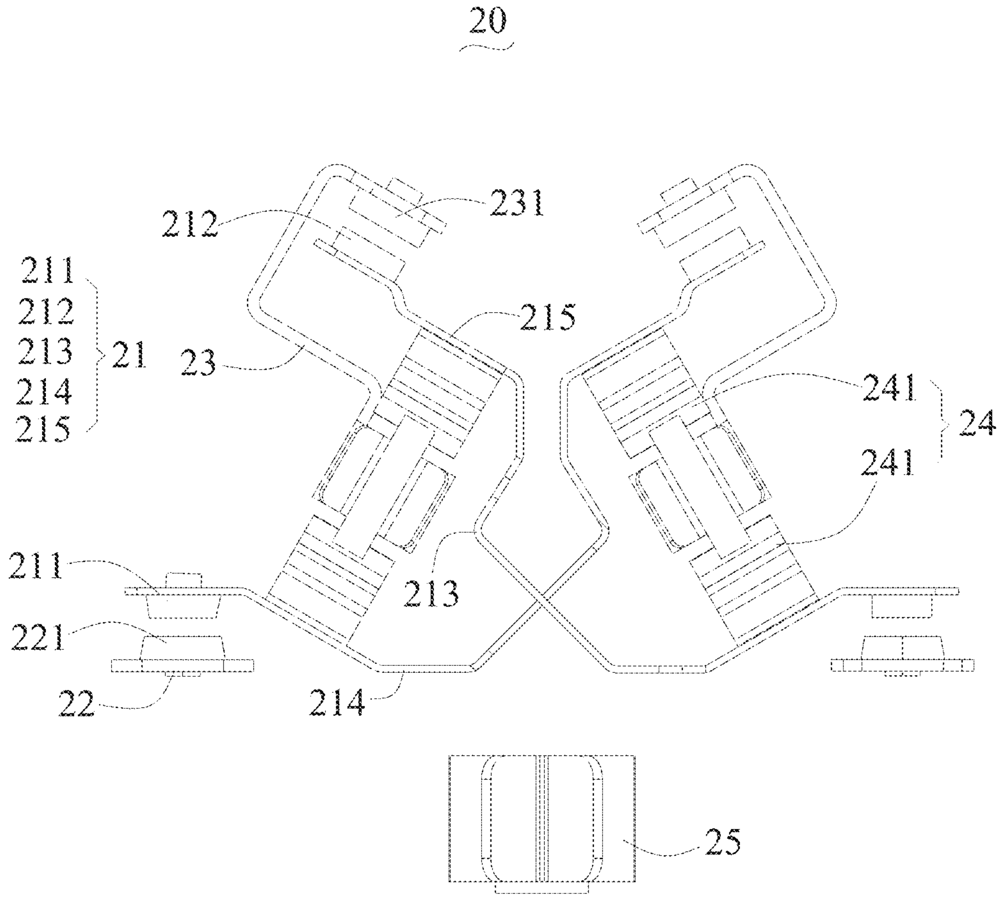
FIG. 4 is the front view of Embodiment 2 for an electrical contact component in FIG. 2.

In some embodiments, as shown in FIG. 3 and FIG. 4, each first conducting strip 21 comprises a connecting segment 213, a first elastic segment 214 formed by bending one end of the connecting segment 213, and a second elastic segment 215 formed by bending the other end of the connecting segment 213, the two connecting segments 213 are arranged crosswise, so that the first elastic segments 214 of the first conducting strips 21 are symmetrically distributed on the left and right sides, and the second elastic segments 215 of the first conducting strips 21 are symmetrically distributed on the left and right sides. The first movable contact 211 can be arranged at the end of the first elastic segment 214 on the side deviating from the plug-in part 232, and the second movable contact 212 can be arranged at the end of the second elastic segment 215 on the side deviating from the plug-in part 232.

In some embodiments, as shown in FIG. 2, a clearance slot 216 can be arranged at the crossing point of the two connecting segments 213 to prevent mutual interference between the two connecting segments 213.

In some embodiments, as shown in FIG. 3 or FIG. 4, each plug-in part 232 can be provided with a jacking structure 24, each jacking structure 24 comprises two jacking pieces 241 respectively arranged on both sides of the plug-in part 232, and the two jacking pieces 241 can be respectively arranged on the first elastic segment 214 and the second elastic segment 215 adjacent to the plug-in part 232 and on one side facing toward the plug-in part 232. Understandably, the two jacking pieces 241 of the jacking structure 24 on the left side are respectively arranged on the first elastic segment 214 and the second elastic segment 215 on the left side, and are respectively located between the plug-in part 232 on the left side and the first elastic segment 214 and between the plug-in part 232 on the left side and the second elastic segment 215, so that the plug pin 30 pushes against the two jacking pieces 241 to cause the first movable contact 211 on the first elastic segment 214 and the second movable contact 212 on the second elastic segment 215 to respectively come into contact with the corresponding first stationary contact 221 and second stationary contact 231 when the plug pin 30 is plugged into the plug-in part 232 on the left side. The same principle applies to the right side, which will not be repeated here.

In some embodiments, the jacking pieces 241 can be made of plastic materials to ensure effective insulation between the jacking structure 24 and the plug pin 30 while the socket is energized.

In some embodiments, as one arrangement form of the electrical contact component 20 shown in FIG. 3, the two first elastic segments 214 can be horizontally arranged, and the two second elastic segments 215 can also be horizontally arranged. Understandably, the plug pin 30 can simultaneously push against both the first elastic segment 214 and the second elastic segment 215 upon plugging into the plug-in part 232 only when the plug-in part 232 is perpendicular to the first elastic segment 214 and the second elastic segment 215 on the same side. Based on the arrangement, the structure is a dual-jack socket structure if the two first elastic segments 214 are horizontally arranged at the upper end and the two second elastic segments 215 are horizontally arranged at the upper end.

In some embodiments, as another arrangement form of the electrical contact component 20 shown in FIG. 4, the two first elastic segments 214 can form an included angle, and the two second elastic segments 215 can also form an included angle, and the included angle of the two first elastic segments 214 is the same as that of the two second elastic segments 215.

Further, as shown in FIG. 4, the anti-creeping structure also comprises a ground conducting strip 25. Understandably, the plug pin 30 can simultaneously push against both the first elastic segment 214 and the second elastic segment 215 upon plugging into the plug-in part 232 only when the plug-in part 232 is perpendicular to the first elastic segment 214 and the second elastic segment 215 on the same side. Based on the arrangement, the two first elastic segments 214 can form an included angle, the two second elastic segments 215 can also form an included angle, and the included angle of the two first elastic segments 214 is the same as that of the two second elastic segments 215. Combined with the ground conducting strip 25, the structure is a three-jack socket structure.

In some embodiments, as shown in FIG. 2, the mounting seat comprises a base 10 and a panel (not shown in the drawings) covered on the base, the base 10 is provided with a mounting groove 11, and the electrical contact component 20 can be placed in the mounting groove 11. The mounting groove 11 comprises two mounting cavities 111 symmetrically arranged and interconnected, one second conducting strip 22, one third conducting strip 23 as well as the first movable contact 211 of one first conducting strip 21 and the second movable contact 212 of the other first conducting strip 21 are arranged in each mounting cavity, and the crossing point of the two connecting segments 213 is positioned at the connection point of the mounting groove 11.

In some embodiments, as shown in FIG. 1, at least two electrical contact components 20 are arranged. Further, the number of mounting grooves 11 can be the same as that of electrical contact components 20.

In some embodiments, as shown in FIG. 1 to FIG. 4, the two second conducting strips 22 can be arranged on the same side within the mounting grooves 11. Understandably, the two second conducting strips 22 are respectively arranged in the two mounting cavities 111 and positioned at the lower ends (the two second conducting strips 22 are oppositely arranged at the upper ends of the two mounting cavities 111), i.e., the two second conducting strips 22 are arranged at the lower sides (i.e., the same side) of the mounting grooves 11 to facilitate the crossed arrangement of the first conducting strips 21 and ensure crossed power transmission when the socket is energized, and the jack on a single side (left or right side) is not energized when the contact on the same side is closed.

The above descriptions are only preferred embodiments of the invention and are not intended to limit the scope of the invention. For those skilled in the art, various changes and variations of the invention are possible. Any modifications, equivalent substitutions, improvements, etc., made within the spirit and principles of the invention shall fall within the scope of the claims of the invention.

The invention claimed is:

1. An anti-misplug socket, characterized by comprising a mounting seat and an electrical contact component arranged in the mounting seat, the electrical contact component comprises two first conducting strips, two second conducting strips and two third conducting strips, the two first conducting strips are arranged crosswise, a first movable contact is arranged at one end of each first conducting strip, and a second movable contact is arranged at the other end thereof;

each second conducting strip is provided with a first fixed contact, and the two first fixed contacts correspond to the two first movable contacts one to one at intervals;

a second fixed contact is arranged at one end of each third conducting strip, the two second fixed contacts correspond to the two second movable contacts one to one at intervals, a plug-in part is arranged at the other end of each third conducting strip, and the two plug-in parts are arranged between the first movable contact of one first conducting strip and the second movable contact of the other first conducting strip.

2. The anti-misplug socket according to claim 1, characterized in that each of the first conducting strips comprises a connecting segment, a first elastic segment bent from one end of the connecting segment and a second elastic segment bent from the other end of the connecting segment, the two connecting segments are arranged crosswise, the first movable contact is arranged at the end of the first elastic segment and deviated from one side of the plug-in part, and the second movable contact is arranged at the end of the second elastic segment and deviated from side of the plug-in part.

3. The anti-misplug socket according to claim 2, characterized in that a clearance slot is arranged at a crossing point of the two connecting segments.

4. The anti-misplug socket according to claim 2, characterized in that each of the plug-in parts is provided with a jacking structure, and each of the jacking structures comprises two top jacking pieces respectively arranged on both sides of the plug-in part, and the two jacking pieces are respectively arranged on the first elastic segment and the second elastic segment near the plug-in part and face towards one side of the plug-in part.

5. The anti-misplug socket according to claim 4, characterized in that the jacking pieces are made of plastic materials.

6. The anti-misplug socket according to claim 2, characterized in that the two first elastic segments are arranged horizontally, and the two second elastic segments are arranged horizontally.

7. The anti-misplug socket according to claim 2, characterized in that the two first elastic segments form an included angle, the two second elastic segments form an included angle, and the included angle of the two first elastic segments is the same as that of the two second elastic segments.

8. The anti-misplug socket according to claim 7, characterized in that an anti-creeping structure also comprises a ground conducting strip.

9. The anti-misplug socket according to claim 1, characterized in that the mounting seat comprises a base provided with a mounting groove, the mounting groove comprises two mounting cavities symmetrically arranged and interconnected, one second conducting strip, one third conducting strip as well as the first movable contact of one first conducting strip and the second movable contact of the other first conducting strip are arranged in each mounting cavity.

10. The anti-misplug socket according to claim 9, characterized in that the two second conducting strips are arranged on the same side in the mounting groove.

* * * * *